United States Patent [19]

Barausch et al.

[11] 4,242,796
[45] Jan. 6, 1981

[54] TREE SAW

[76] Inventors: Victor Barausch; Anton Barausch, both of 4902 Imperial, Houston, Tex. 77401

[21] Appl. No.: 77,136

[22] Filed: Sep. 19, 1979

[51] Int. Cl.³ ............................................. B27B 21/00
[52] U.S. Cl. ................................ 30/166 R; 145/31 R; 83/830
[58] Field of Search ................. 145/31 R; 30/166 R, 30/381; 83/830; 144/34 R

[56] References Cited

U.S. PATENT DOCUMENTS

| | | | |
|---|---|---|---|
| 1,004,245 | 9/1911 | Crouch | 83/832 |
| 1,229,597 | 6/1917 | Farrer | 83/830 |
| 2,752,964 | 7/1956 | Prusinski | 145/31 R |
| 3,747,652 | 7/1973 | Meadows | 145/31 R |

Primary Examiner—Donald R. Schran
Attorney, Agent, or Firm—Jennings B. Thompson; Marvin B. Eickenroht

[57] ABSTRACT

A saw operable from ground level for cutting limbs from a tree is disclosed. The saw comprises a plurality of relatively short, flat-sided, thin saw blades with each blade having saw teeth along at least one edge. The saw blades are connected together so that they can pivot relatively around axes perpendicular to the flat sides of the saw blades. Thus, when the saw is positioned over a tree limb the individual saw blades will inherently assume a position in a plane transverse the axis of the limb with the saw teeth in position to cut through the limb as the saw is pulled back and forth across the limb.

5 Claims, 6 Drawing Figures

TREE SAW

This invention relates to tree saws generally and in particular to saws for trimming limbs from trees.

The saw of this invention can be used for other purposes, but it has particular utility when used to trim tree limbs. Trimming limbs from a standing tree has always presented a problem, where the limbs are far enough above the ground that they can't be comfortably reached by a person standing on the ground.

It is an object of this invention to provide an improved saw that can be positioned around the tree limb and operated from ground level to cut a limb from a tree.

It is another object of this invention to provide such a saw that will cut through a tree limb with a minimal amount of the wood having to be cut away. In other words, the kerf cut by the saw is not substantially greater than the kerf cut by a thin-bladed, hand-operated saw.

It is another object of this invention to provide a saw comprising a plurality of flat-sided, thin saw blades pivotally connected together that will inherently tend to assume a position with the blades lying in a plane generally transverse the longitudinal axis of the limb when the saw is draped over the limb.

These and other objects, advantages and features of this invention will be apparent to those skilled in the art from a consideration of this specification, including the appended claims and attached drawings.

IN THE DRAWINGS:

FIG. 1 on the lefthand side shows a workman positioning the saw of this invention over a tree limb to be removed from the trunk of the tree. On the righthand side, a worker is using the saw of this invention to saw a limb from the tree;

Figure 3:
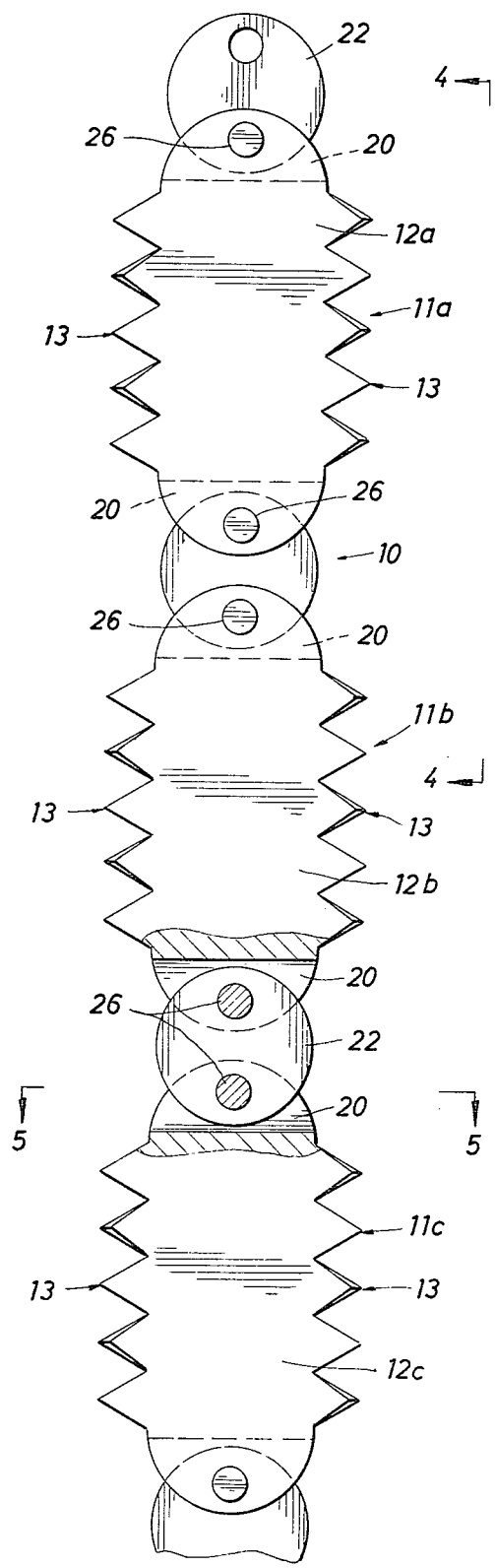
FIG. 3 is a side view on an enlarged scale of a portion of the saw of this invention.
Figure 4:
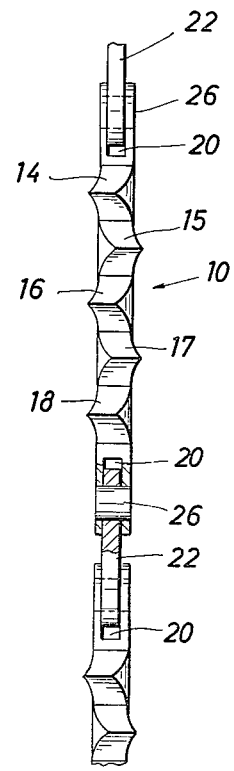
FIG. 4 is a side view looking in the direction indicated by arrows 4—4 of the saw of FIG. 3.
Figure 5:
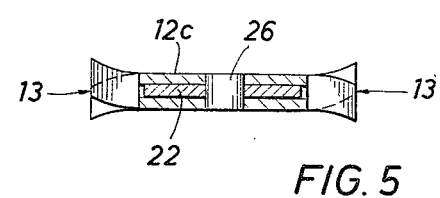
FIG. 5 is a sectional view taken along line 5—5 of FIG. 3.

The details of construction of the preferred embodiment of the saw of this invention is shown in FIGS. 2 through 5. The saw, generally indicated by the number 10, includes a plurality of saw blades 11. The saw blades are all of like construction. Three of the saw blades, 11a, 11b and 11c are shown on an enlarged scale in FIGS. 3 through 5. Like all the other saw blades, these three comprise relatively short, thin, flat-sided members 12a, 12b, and 12c. Each member has saw teeth 13 formed along opposite edges of the blade member. The teeth, as best seen in FIG. 4, are preferably shaped for cross cutting. The teeth are set to cut a kerf that is wider than the thickness of the body of the saw blade. For example, as shown in FIG. 4, alternate teeth such as 14, 16 and 18 are set to the lefthand side of the saw blade as viewed in FIG. 4, and alternate teeth 15 and 17 are set to extend to the opposite side. The thickness of the saw blade body should be kept to a minimum so that the amount of wood required to be removed to sever a limb is kept to a minimum.

Means are provided to connect the saw blades in end-to-end relationship for relative pivotal movement around axes perpendicular to the flat sides of the saw blades. In the embodiment shown, each saw blade is provided with grooves 20 at each end into which discs 22 may be inserted. Pivot pins 24 extend through openings provided therefor in the ends of the saw blades and in discs 22 to connect the end of each saw blade to a disc 22 and in turn to the adjacent saw member connected at the opposite side of the disc, as shown in FIG. 3. The number of saw blades used will be determined by the size limbs to be cut and the length of the individual saw blades.

Figures 1, 2:
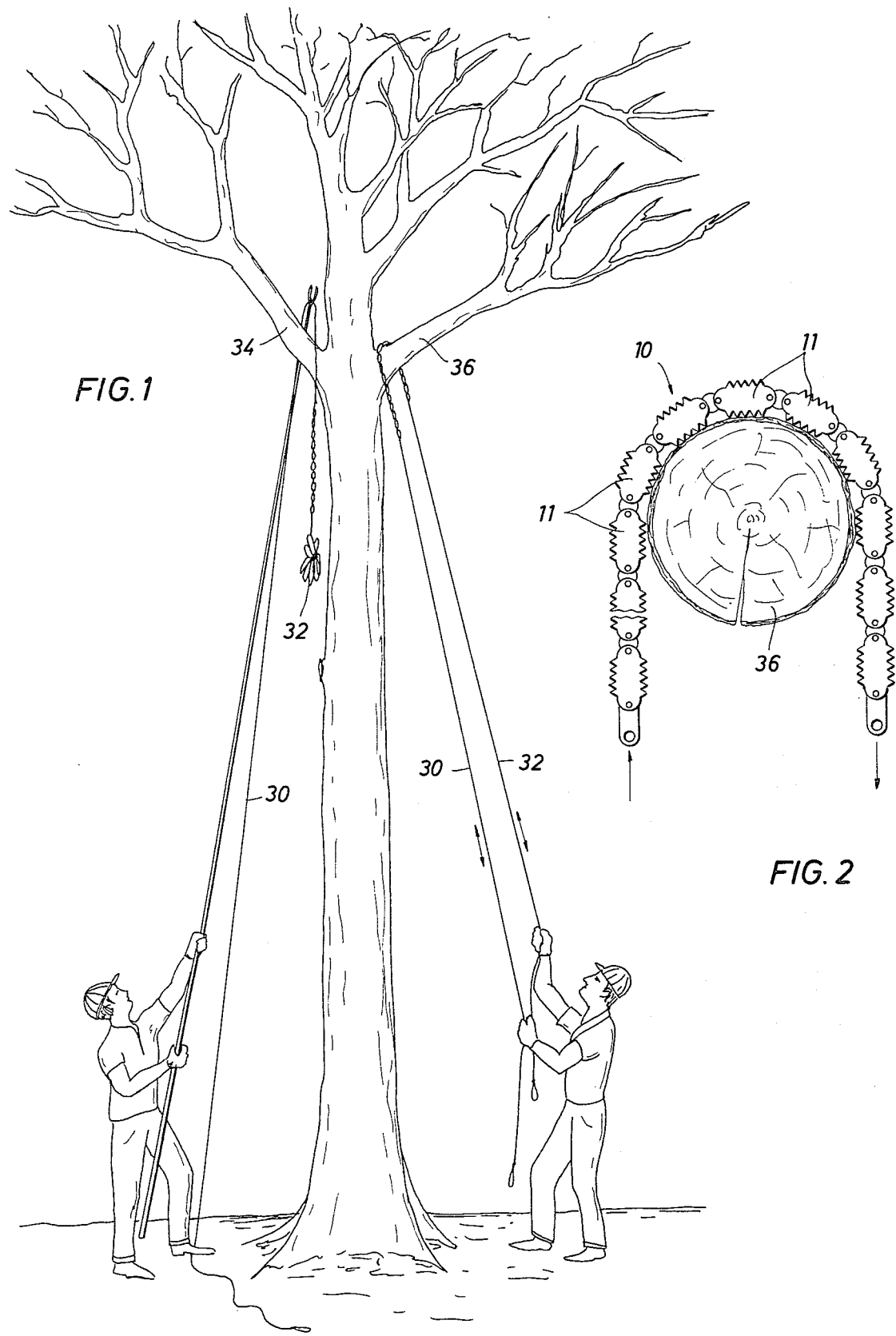
FIG. 2 is a sectional view through a tree limb with the preferred embodiment of the saw of this invention in position to cut through the limb.

To use the saw to trim a limb from a tree, flexible lines 30 and 32 are connected at opposite ends of a plurality of pivotally-connected saw blades, such as shown in FIG. 2. One of the lines can be thrown over the limb and then used to pull the saw into position over the limb, as shown in FIG. 2, or alternately, as shown in FIG. 1, line 32 can be coiled up and a pole used to position line 32 and saw 10 over tree limb 34. Sufficient line, of course, is provided to allow the saw and coiled line 32 to be lowered down far enough to permit the coil to be undone. The saw is then moved back up to where the saw is draped around tree limb 34. Once this is accomplished, as for example as shown on the right-hand side of FIG. 1, lines 30 and 32 are moved back and forth alternately to cause the saw blade to cut through the limb 36.

The saw of this invention will inherently tend to assume a position with the saw blades in a vertical plane due to its own weight when the saw is draped over a limb, as shown in FIG. 2. This results because the weight of the unsupported portion of the saw on opposite sides of the limb will produce an unbalanced turning moment between the axes of the pivot pins and one or the other of the toothed edges of the blades causing the blades to move to a position where the weight of the unsupported portions of the saw produces no unbalanced forces. This is the position when the blades are all in a vertical plane. The width of the blades is an important consideration in obtaining this feature of the saw. The blades should be wide enough for the distance between the edges of the blades and the axes of the pivot pins, which is the moment arms through which the downward force of the unsupported portion acts, to easily move the blades to the desired position.

As explained above, the saw will assume a position with the saw blades in a vertical plane due to its own weight. The force exerted by the operator may not be in the vertical plane. For example, the workman on the righthand side of FIG. 1 is pulling on lines 30 and 32 at an angle to the vertical. As this forces is initially applied by the workman the same unbalanced moment is produced which will move the saw blades into alignment with the plane of the downward force applied by the workman. Thus, the saw can be used to cut a limb at an angle to the vertical. This may be frequently desirable, since it allows a limb to be cut from a tree relatively close to its trunk while the workman stands a convenient distance from the trunk. Also, it allows the operator to operate the saw from a position other than below the limb. This is important for obvious safety reasons.

Figure 6:
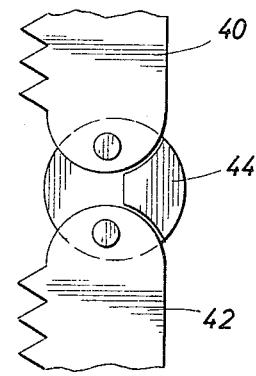
FIG. 6 is an alternate embodiment of the saw of this invention.

In the preferred embodiment, saw teeth are provided on both edges of each saw blade body. In FIG. 6, an alternate embodiment is shown wherein saw teeth are provided only on one side of the saw blade members, such as saw blades 40 and 42. These saw blade members are connected in the same way as described above in connection with the embodiment in FIGS. 2 through 5, with the exception that in this embodiment, means are provided to limit the relative rotation of the two saw blade members in the direction that moves the toothed edges apart. In the embodiment shown, stop member 44 is positioned to engage the ends of saw members 40 and 42 and limit the rotation of the saw blades in this direction to a position with the smooth edges of the blades in axial alignment. In this way, the saw will always move into position to cut through a tree limb with the saw teeth directed toward the limb, since it can relieve the unbalanced turning moment only by moving into that position.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A saw operable from ground level for cutting limbs from a tree compsing a plurality of saw blades, each blade comprising a relatively short, thin, flat-sided member having cutting teeth on its edge, and means connecting the saw blades in spaced, end-to-end relationship for relative pivotal movement around axes perpendicular to the flat sides thereof said connecting means being equal to or less in width than the saw blades and connects the saw blades so that the blades and the connecting means lie in the same place and the force applied to the ends of the saw is transmitted to the saw blades along the longitudinal axis of the blades so that when the saw is positioned over the top of a tree limb, the individual saw blades will assume a position with the blades in a plane generally transverse the longitudinal axis of the limb and in the plane of the forces that are alternately applied to the end saw blades to move the blades back and forth across the limb to cause the teeth to cut through the limb.

2. The saw of claim 1 in which both edges of the saw blades have cutting teeth.

3. A saw for trimming limbs from trees comprising a plurality of thin, relatively wide, flat-sided saw blades having a plurality of saw teeth along both edges of the saw blades, a flat-sided connecting member positioned between each adjacent blade and lying in the same plane as the blades, and pivot pins connecting each blade to the member for pivotal movement between the blade and the connecting member around axes perpendicular to the plane in which the blades and the member lie and for transmitting any force applied to the saw blades at the end of the saw directly between the saw blades along the longitudinal axis of the saw blades.

4. The saw of claim 3 in which the pivot pins transmit the force between adjacent blades along a line equidistant between the toothed edges of the blades.

5. The saw of claim 3 in which each saw blade has a groove at each end and the connecting member extends into the grooves of adjacent saw blades and in which each pivot pin extends through the saw blade, the groove and the connecting member to connect the blade to the connecting member for relative pivotal movement and to transmit force between the blade and the connecting member along the longitudinal axis of the blade and the connecting member.

* * * * *